(12) United States Patent
Phillips et al.

(10) Patent No.: US 11,334,872 B2
(45) Date of Patent: May 17, 2022

(54) SYSTEMS AND METHODS FOR PERSONALIZING PAYMENT CARDS

(71) Applicant: MASTERCARD INTERNATIONAL INCORPORATED, Purchase, NY (US)

(72) Inventors: Simon Phillips, York (GB); Alan Johnson, Maldon (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/411,816

(22) Filed: May 14, 2019

(65) Prior Publication Data
US 2019/0354959 A1    Nov. 21, 2019

Related U.S. Application Data

(60) Provisional application No. 62/671,647, filed on May 15, 2018.

(51) Int. Cl.
*G06Q 20/40* (2012.01)
*G06Q 20/34* (2012.01)

(52) U.S. Cl.
CPC ....... *G06Q 20/3552* (2013.01); *G06Q 20/352* (2013.01); *G06Q 20/4097* (2013.01)

(58) Field of Classification Search
CPC ............. G06Q 20/3552; G06Q 20/352; G06Q 20/4097
See application file for complete search history.

(56) References Cited

U.S. PATENT DOCUMENTS

| 10,009,177 | B2* | 6/2018 | Hammad | G06Q 20/385 |
| 11,037,139 | B1* | 6/2021 | Ho | G06Q 20/3221 |
| 2009/0100511 | A1 | 4/2009 | Phillips et al. | |
| 2009/0164380 | A1 | 6/2009 | Brown | |
| 2010/0044433 | A1* | 2/2010 | Wankmueller | G06Q 20/3558 235/381 |
| 2012/0198548 | A1 | 8/2012 | Chen | |

(Continued)

FOREIGN PATENT DOCUMENTS

| CN | 103178967 A | * | 6/2013 |
| KR | 101777651 B1 | * | 9/2017 |

OTHER PUBLICATIONS

PCT International Search Report for Application No. PCT/US2019/031111 dated Aug. 30, 2019, 13 pp.

*Primary Examiner* — Mike Anderson
*Assistant Examiner* — Matthew Cobb
(74) *Attorney, Agent, or Firm* — Buckley, Maschoff & Talwalkar LLC

(57) ABSTRACT

A first communication channel is established between a contactless blank IC (integrated circuit) payment card and a mobile device. The mobile device is in proximity to the contactless blank IC payment card. A second communication channel is established, via the mobile device, between a remote personalization server computer and the contactless blank IC payment card. Payment card personalization data is received and stored in the contactless blank IC payment card. The data had been downloaded from the remote personalization server computer to the contactless blank IC payment card via the second communication channel.

8 Claims, 5 Drawing Sheets

(56) References Cited

U.S. PATENT DOCUMENTS

| | | | |
|---|---|---|---|
| 2013/0305035 A1* | 11/2013 | Lyne | H04L 9/00 |
| | | | 713/150 |
| 2015/0014411 A1 | 1/2015 | Balamurugan et al. | |
| 2015/0262167 A1 | 9/2015 | Wankmueller et al. | |
| 2016/0005032 A1* | 1/2016 | Yau | G06F 21/445 |
| | | | 705/69 |
| 2016/0261411 A1* | 9/2016 | Yau | H04L 63/0492 |
| 2016/0300228 A1* | 10/2016 | Scipioni | G06F 16/5838 |
| 2017/0300894 A1 | 10/2017 | Shanmugam | |

* cited by examiner

SYSTEMS AND METHODS FOR PERSONALIZING PAYMENT CARDS

CROSS REFERENCE TO RELATED APPLICATION

This application claims the benefit of U.S. Provisional Patent Application No. 62/671,647 (filed on May 15, 2018); the contents of which provisional application are hereby incorporated by reference for all purposes.

BACKGROUND

Payment card accounts are in widespread use. Payment cards and/or associated payment account numbers or payment tokens are frequently presented by consumers and businesses to pay for in-store purchase transactions, online shopping transactions, bill payments and other purposes.

One known manner for accessing a payment card account is by presenting a payment card or other device at a point of sale in a retail store. According to current usage, in most instances, payment cards that are issued include an integrated circuit (IC) and hence are referred to as "chip cards" or "smart cards." Many payment cards have a set of electrical contacts on a front surface of the card. Via the contacts, the IC on the card may be coupled for data communication with a payment terminal (POS device—"point of sale" device) into which the chip card is inserted. Some types of payment IC cards include an antenna and are configured to interact by contactless radio communication with payment terminals. Many payment IC cards are configured for both contact and contactless interaction with payment terminals, and thus may be used with either contact terminals or contactless terminals.

Payment cards are issued by banks or other financial institutions to individuals and organizations to permit such entities to access payment accounts issued to them by the account issuers. In a typical scenario, an individual may apply online to the account issuer's website to have a payment account issued to the individual. Assuming the account issuer approves the application, the account issuer opens the payment account for the individual, and causes a payment card representing the new account to be processed and sent to the individual by mail.

The process by which the payment card is issued includes what is referred to as personalization. Typically, during personalization, the card intended for the individual posited above is included in a batch process in which numerous items of card stock (card blanks) are processed by a large personalization machine that can personalize a large number of cards in a relatively short period of time. Typically now a card blank includes an IC and is configured for contact and/or contactless transactions. The overall personalization may include "pre-personalization," in which a suitable application program is loaded into the card blank for storage in the IC on the card blank. The card blank typically comes pre-printed with branding for the account issuer, the relevant payment network, and the particular card product as well. The pre-printed visual aspect of the card blank may also typically include design/artwork to enhance the visual attractiveness of the card. It is also not unusual to include security elements such as holograms on the card blank.

After pre-personalization, the card blank may be supplied as part of a batch of identical blanks to a personalization machine for personalization processing. During the personalization, information related to the specific individual for whom the card is intended is applied/written to the card. One aspect of personalization may include embossing the account holder's name and the applicable payment account number on the card. It also is common for the issue date and expiration date of the card to be embossed on the card blank.

Typical card blanks also include a magnetic stripe, and one stage of the personalization process typically includes the personalization machine magnetically writing account-specific information (and also perhaps information that is not account-specific) into tracks on the magnetic stripe.

More critically, the payment account number, the account holder's name, and the card expiration date and other information are written into the card IC, so that the IC is enabled to communicate this account-/individual-specific information to payment terminals during use of the card in payment transactions.

In many instances, the writing of the account-specific information into the card occurs via a data communication path between the personalization machine and the card IC established by contact with electrically conductive contact pads on the card blank (i.e., the same contact pads to be used in contact-terminal payment transactions). It has also been proposed and implemented that the writing of the account-specific information into the card IC by the personalization machine be accomplished by contactless transmission (i.e., short range radio data transmission). For such arrangements, the card is configured to receive and store the account-specific information contactlessly, and the personalization machine includes suitable radio transmission capabilities to power up the card blank and to implement the contactless writing of the account-specific information.

Continuing to lay out the typical card issuance scenario, it is common for at least a few days to elapse from the time the account issuer approves the account application and directs that the card be issued (with account issuance and assignment of an account number occurring virtually without delay) until the card is actually personalized and sent to the account holder. It would be desirable to eliminate this delay in issuance of the physical payment card, so that the account holder has an immediate ability to access the newly issued payment account.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a mobile device such as a smartphone is configured and programmed to personalize a payment card brought into proximity to the mobile device. The personalization may include contactless writing of account-specific information into the payment card IC by the mobile device. In some embodiments, the mobile device may serve as a link in a data channel that couples the payment card IC with a remote personalization server computer. In such embodiments, the payment card IC and the personalization server may engage in mutual authentication, and then the personalization server may download to the mobile device the account-specific information to be written into the payment card IC by the mobile device.

Figure 1:
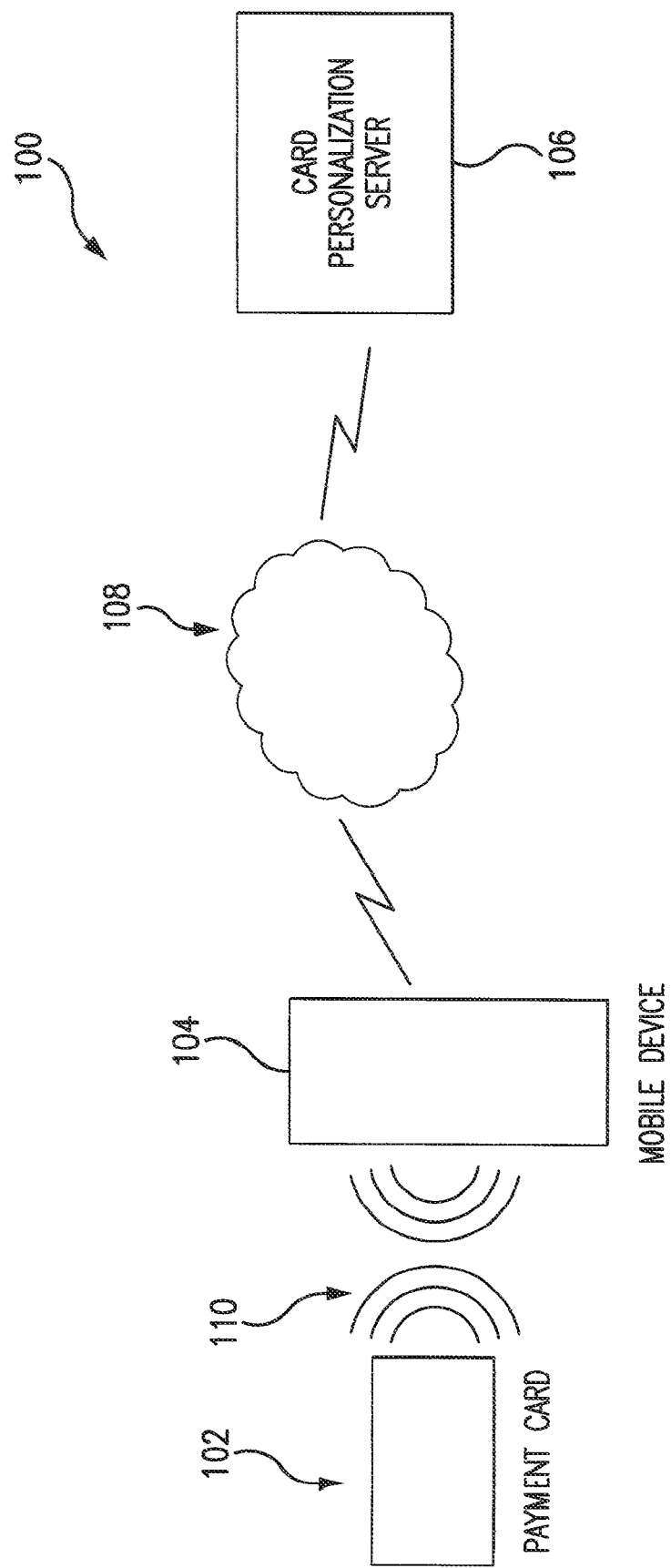
FIG. 1 is a block diagram of a portion of a payment card personalization system according to some embodiments.

FIG. 1 is a block diagram of a portion of a payment card personalization system 100 according to some embodiments.

As suggested above, a function of the personalization system 100 is to personalize the IC payment card indicated at 102 in FIG. 1. The direct, contactless writing of account specific information to the payment card 102 is performed by a mobile device 104, which may be considered part of the personalization system 100. The mobile device 104 is shown in communication with a remote card personalization server computer 106, which is also to be deemed part of the personalization system 100. The communication between the mobile device 104 and the personalization server 106 occurs via a telecommunication/data communication infrastructure 108, which may be the commonly available infrastructure by which mobile devices are enabled to exchange data communications with remote computers.

The short range radio communication between the mobile device 104 and the payment card 102 is indicated at 110 in FIG. 1.

In a practical embodiment of the card personalization system 100, the card personalization server computer 106 may operate to simultaneously engage in personalization processes for numerous payment IC cards, and thus may be in simultaneous communication with numerous mobile devices (not shown apart from mobile device 104) configured for that purpose. Thus, the depiction of the system 100 in FIG. 1 relates to only one of a number of card personalization operations that may be performed simultaneously and/or over time.

Figure 2:
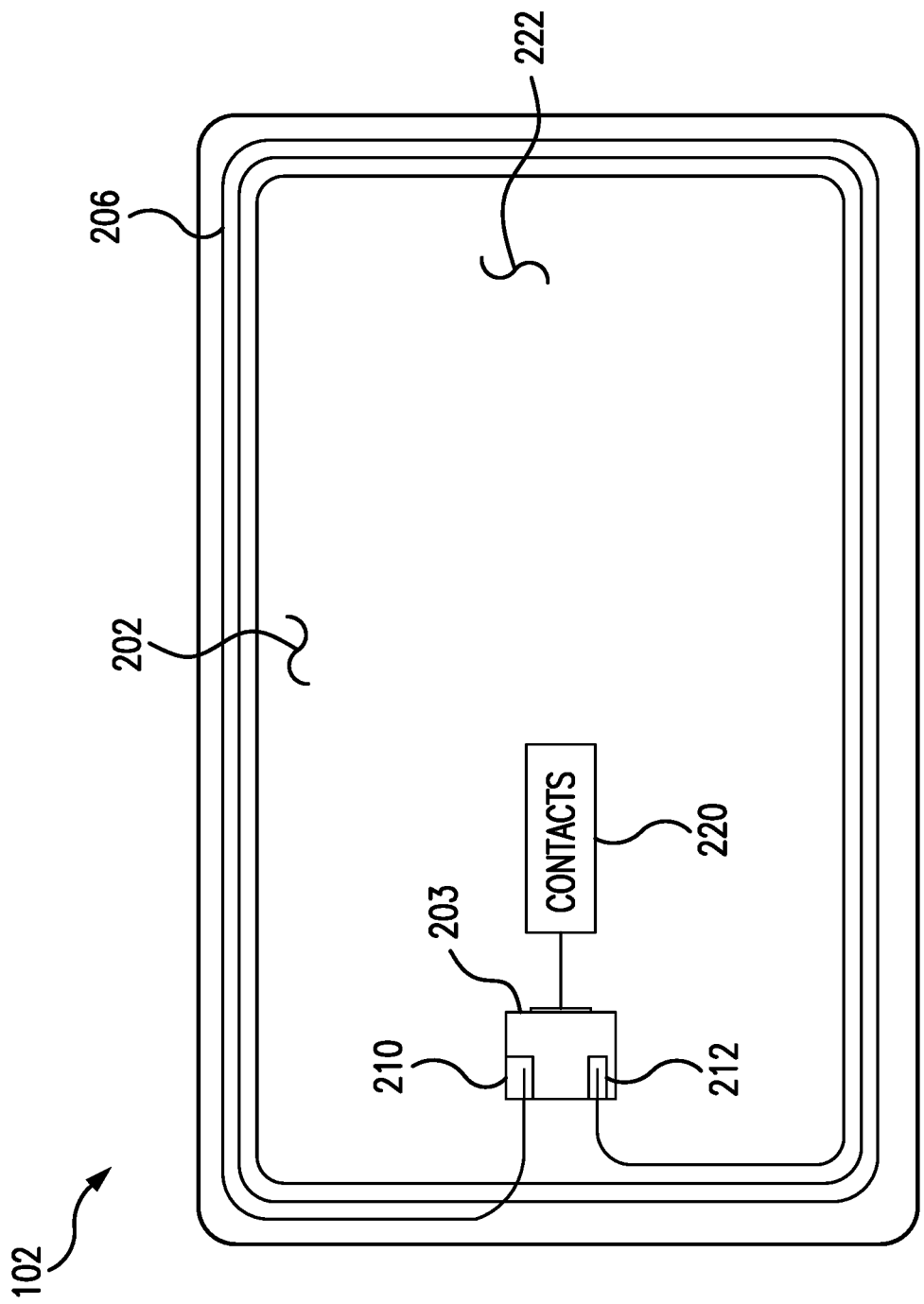
FIG. 2 is a schematic plan view of an example embodiment of the payment card depicted in FIG. 1.

FIG. 2 is a schematic plan view of an example embodiment of the payment card 102 depicted in FIG. 1.

Referring to FIG. 2, in this embodiment, the payment card 102 has a support structure 202 with an outer surface that defines a card shaped body. The card shaped body may be formed of plastic or other suitable material and may resemble conventional payment cards in shape and size. In some embodiments, the card shaped body has dimensions defined for the standard card referred to as "ID1" in ISO/IEC standard 7810, promulgated by the International Standardization Organization.

In this embodiment, the payment card 102 further includes an IC 203 and an antenna 206. The IC 203 includes control/storage circuitry and transmit/receive circuitry, both of which are not shown apart from the IC 203.

The antenna 206 may be mounted in, embedded in and/or otherwise supported by the card-shaped body. As shown, the antenna 206 may comprise several loops arranged along the periphery of the card-shaped body. Alternatively, the antenna 206 may be of a different type and/or configuration.

The IC 203 may include electrically conductive contact pads 210, 212 via which the transmit/receive circuitry of the IC 203 may be electrically connected to the antenna 206.

The IC 203 may be configured and/or programmed and the payment card 102 otherwise provided so as to duplicate or emulate the functionality of the types of payment IC card blanks that have heretofore been supplied for contactless personalization by contactless personalization machines.

One or more logos and/or brands, including for example the brand/logo of a national and/or international payment card network operator, such as Mastercard International Incorporated, may be provided on one or more surfaces of the payment card 102. The brand/logo of the issuer may also be provided, as well as, for example, a specific card product brand. Co-branding, as discussed below, may also appear on the card blank.

The payment card 102 may also include a conventional set of contacts 220 (schematically represented in FIG. 2) located on a front surface 222 of the support structure 202. The contacts may take the form of electrically conductive pads and may be laid out in a pattern prescribed in an applicable international standard for contact IC identification cards. The contacts 220 may be suitably coupled to the IC 203 of the payment card 102, to enable the payment card 102 to function (once personalized and activated) as a contact payment IC card.

Figure 3:
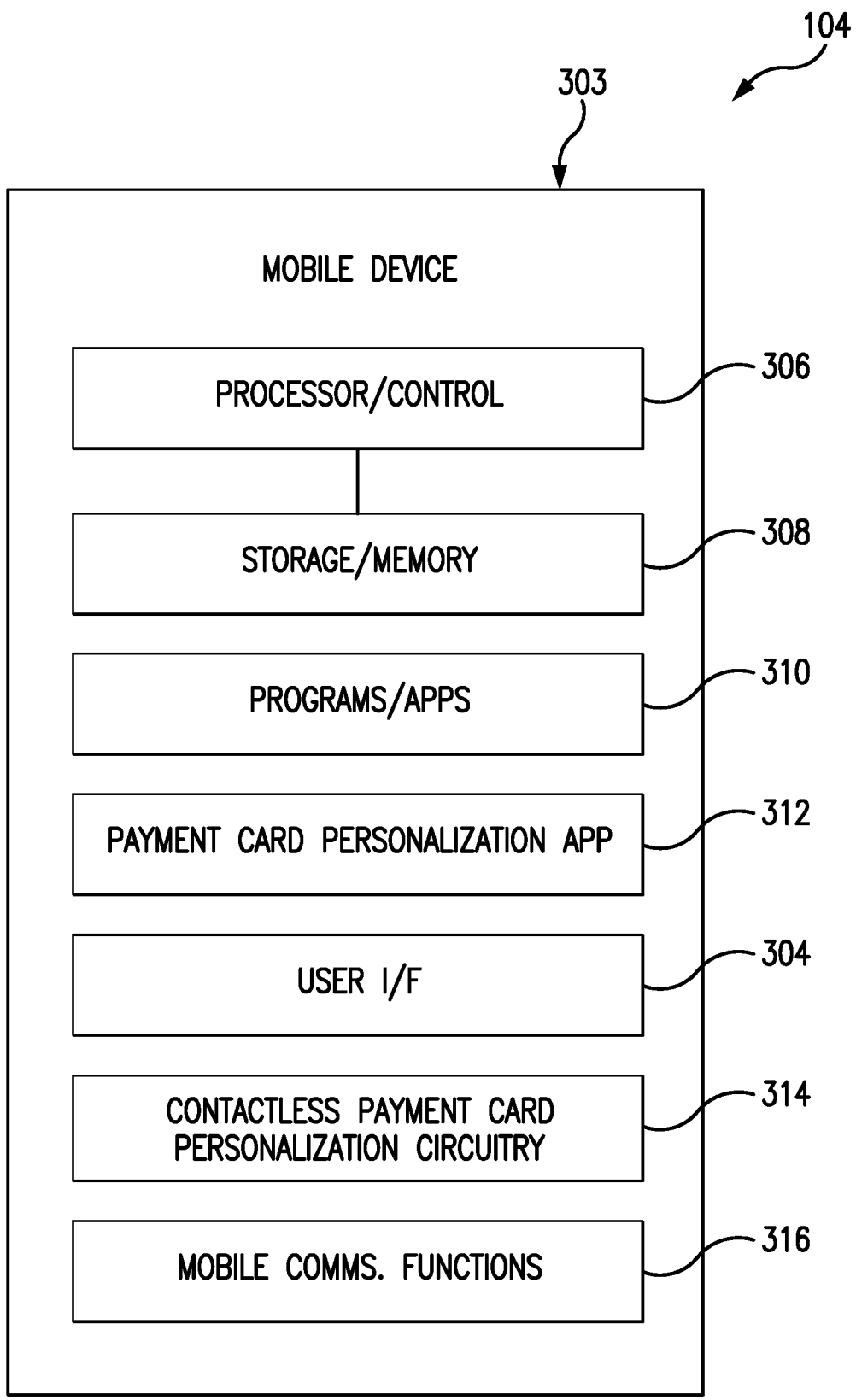
FIG. 3 is a simplified block diagram of an example of a mobile device that may be part of the personalization system of FIG. 1.

FIG. 3 is a simplified block diagram of an example embodiment of the mobile device 104 shown in FIG. 1.

Referring to FIG. 3, the mobile device 104 may include a housing 303. In many embodiments, the front of the housing 303 is predominantly constituted by a touchscreen (not separately shown), which is a key element of the user interface 304 of the mobile device 104.

The mobile device 104 further includes a mobile processor/control circuit 306, which is contained within the housing 303. Also included in the mobile device 104 is a storage/memory device or devices (reference numeral 308). The storage/memory devices 308 are in communication with the processor/control circuit 306 and may contain program instructions to control the processor/control circuit 306 to manage and perform various functions of the mobile device 104. As is well-known, a device such as mobile device 104 may function as what is in effect a pocket-sized personal computer (assuming for example that the mobile device is a smartphone), via programming with a number of application programs, or "apps," as well as a mobile operating system (OS). (The apps are represented at block 310 in FIG. 3, and may, along with other programs, in practice be stored in block 308, to program the processor/control circuit 306.)

Because of its particular relevance to the subject matter of this disclosure, one of the apps—namely a payment card personalization app—is represented in the drawing as block 312, separate from the other apps 310. The payment card personalization app 312 may program the mobile device 104 to perform functionality as described herein, particularly with reference to FIG. 5. In some embodiments, the payment card personalization app 312 may be realized as part of the functionality of a wallet app that runs on the mobile device 104.

Block 314 in FIG. 3 represents hardware, software and/or firmware features of mobile device 104 that enable the mobile device 104 to emulate the contactless data-writing capabilities of previously deployed contactless personalization machines. It is well within the abilities of those who are skilled in the art to design and equip a mobile device with such hardware, software and/or firmware in view of the guidance provided by this disclosure.

As is typical for mobile devices, the mobile device 104 may include mobile communications functions as represented by block 316. The mobile communications functions may include voice and data communications via a mobile communication network with which the mobile device 104 is registered.

From the foregoing discussion, it will be appreciated that the blocks depicted in FIG. 3 as components of the mobile device 104 may in effect overlap with each other, and/or there may be functional connections among the blocks which are not explicitly shown in the drawing. It may also be assumed that, like a typical smartphone, the mobile device 104 may include a rechargeable battery (not shown) that is contained within the housing 303 and that provides electrical power to the active components of the mobile device 104.

It has been posited that the mobile device 104 may be embodied as a smartphone, but this assumption is not intended to be limiting, as mobile device 104 may alternatively, in at least some cases, be constituted by a tablet computer or by other types of mobile computing devices.

Figure 4:
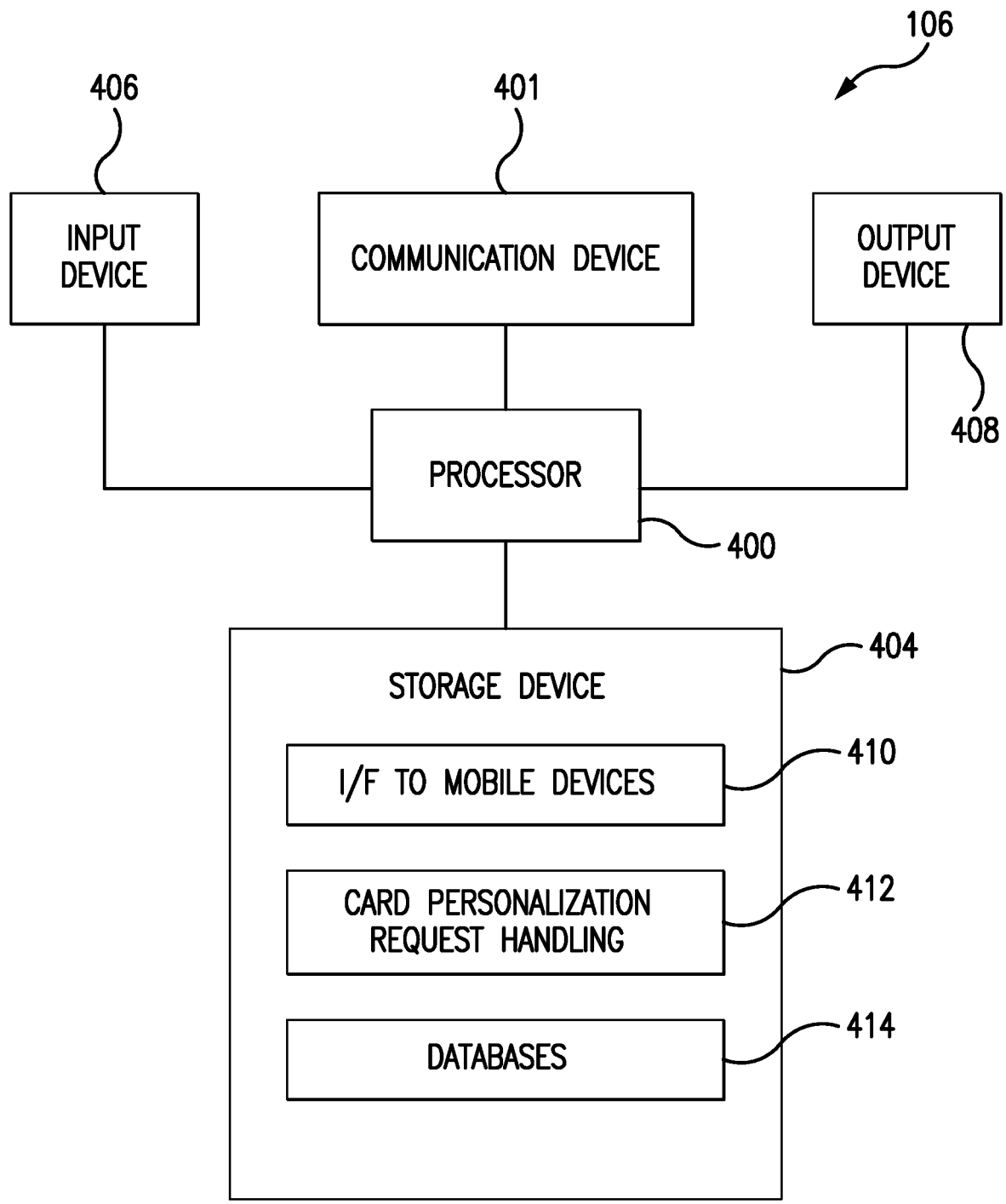
FIG. 4 is a block diagram that illustrates a computer system that may play a role in the personalization system of FIG. 1.

FIG. 4 is a block diagram that illustrates an example embodiment of the card personalization server computer 106 shown in FIG. 1. The card personalization server computer 106 may, in its hardware aspects, resemble a typical mainframe or server computer, but may be controlled by software to cause it to function as described herein.

Referring to FIG. 4, the card personalization server computer 106 may include a computer processor 400 operatively coupled to a communication device 401, a storage device 404, an input device 406 and an output device 408. The communications device 401, the storage device 404, the input device 406 and the output device 408 may all be in communication with the processor 400.

The computer processor 400 may be constituted by one or more processors. Processor 400 operates to execute processor-executable steps, contained in program instructions described below, so as to control the card personalization server computer 106 to provide desired functionality.

Communication device 401 may be used to facilitate communication with, for example, other devices such as the mobile device 104 and other mobile devices. Communication device 401 may comprise numerous communication ports (not separately shown), to allow the card personalization server computer 106 to communicate simultaneously with a considerable number of mobile devices.

Input device 406 may comprise one or more of any type of peripheral device typically used to input data into a computer. For example, the input device 406 may include a keyboard and a mouse. Output device 408 may comprise, for example, a display and/or a printer.

Storage device 404 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 404 stores one or more programs for controlling processor 400. The programs comprise program instructions (which may be referred to as computer readable program code means) that contain processor-executable process steps of the card personalization server computer 106, executed by the processor 400 to cause the card personalization server computer 106 to function as described herein.

The programs may include one or more conventional operating systems (not shown) that control the processor 400 so as to manage and coordinate activities and sharing of resources in the card personalization server computer 106, and to serve as a host for application programs (described below) that run on the card personalization server computer 106.

The storage device 404 may also store a software interface 410 that facilitates communication between the card personalization server computer 106 and mobile devices employed in the system 100 for card personalization operations.

The programs stored in the storage device 404 may also include, for example, a card personalization request handling application program 412. The card personalization request handling application program 412 may operate to facilitate card personalization operations in a manner or manners to be described below.

The storage device 404 may also store, and the card personalization server computer 106 may also execute, other programs, which are not shown. For example, such programs may include communications software and a reporting application. The latter program may respond to requests from system administrators for reports on the activities performed by the card personalization server computer 106. The other programs may also include, e.g., device drivers, database management software, website hosting software, etc.

The storage device 404 may also store one or more databases 414 needed for operation of the card personalization server computer 106.

Figure 5:
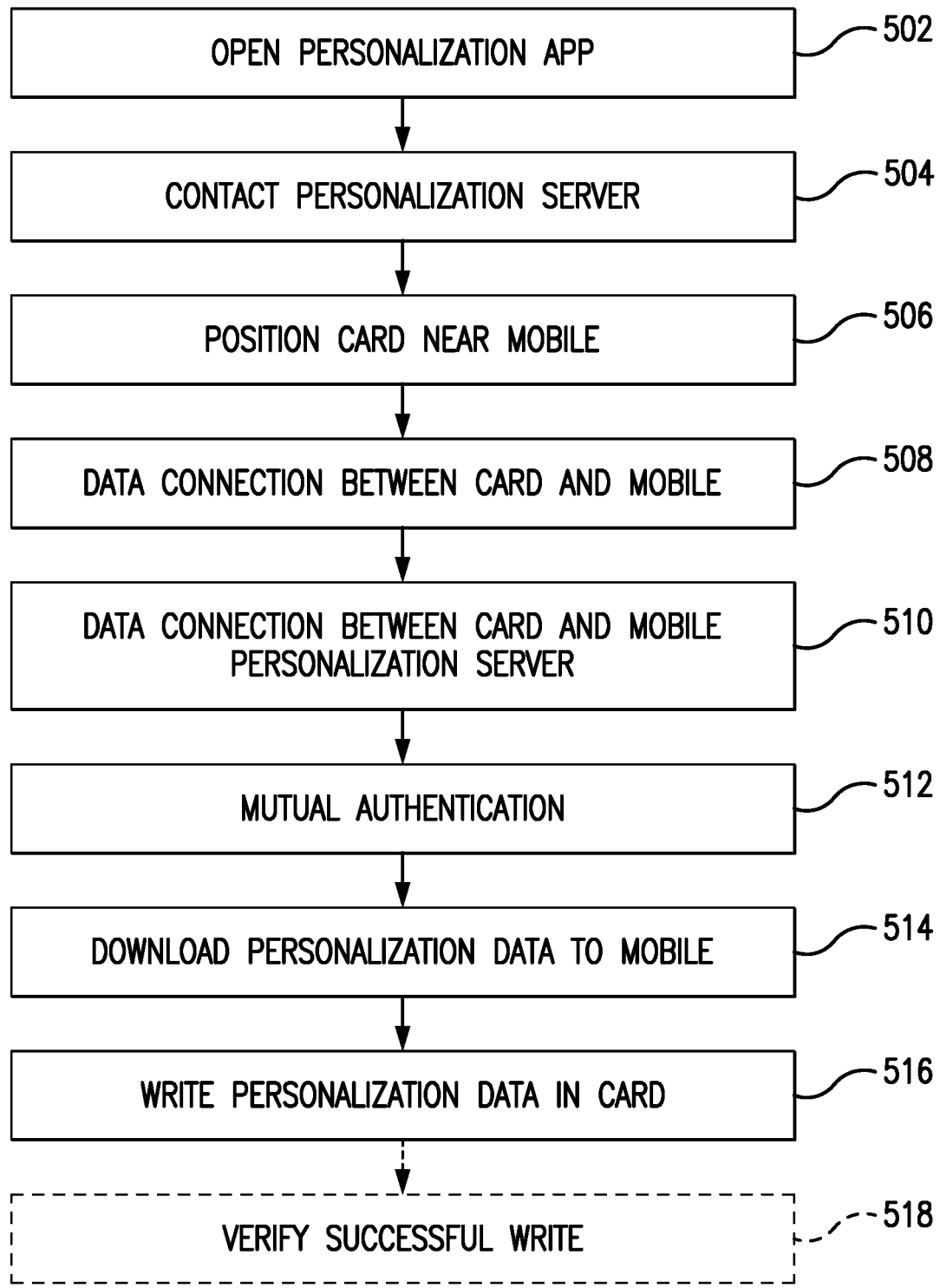
FIG. 5 is a flow chart that illustrates a process that may be performed in the system of FIG. 1 in accordance with aspects of the present disclosure.

FIG. 5 is a flow chart that illustrates an example of a payment card personalization process that may be performed in the personalization system 100 of FIG. 1, according to aspects of the present disclosure.

According to one use case, the process of FIG. 5 may be performed at a retail store operated by a large manufacturer/seller of mobile devices and/or at the retail store of a mobile network operator (MNO). It may be assumed that payment card blanks are kept in stock in the retail store to facilitate instant issuance/personalization of payment cards co-branded with the operator of the retail store. The payment card blanks may carry suitable branding/design elements indicating the co-branding, the branding of the account-issuing financial institution, the branding of the applicable payment network and branding of the particular card product.

In some scenarios, when the user makes a purchase, signs up for a cell phone service contract or engages in another type of transaction, the user may be offered a pre-approved payment card account of the above-mentioned card product. For purposes of FIG. 5, it may be assumed that the user accepts this offer. It may further be assumed that the card blanks have all been "pre-personalized," i.e., loaded with a suitable IC card operating system and payment card application to support operation of the card blank as an IC payment card and to support writing of the new account holder's account-specific (and user-specific) information into the card blank. It is further assumed that a store employee has access to a suitably programmed mobile device (such as the device described above with reference to FIG. 3) to allow the personalization process of FIG. 5 to proceed.

At 502 in FIG. 5, the store employee (not shown) may operate the mobile device 104 to open/launch the payment card personalization app 312 referred to in connection with FIG. 3.

Continuing to refer to FIG. 5, at 504 the store employee may interact with the payment card personalization app 312 such that a communication channel is established between the mobile device 104 and the remote personalization server 106. The communication channel may be provided at least in part "over the air" via a mobile telephone network with which the mobile device 104 is registered. In addition, a portion of the communication channel may be via the internet and/or one or more private data communication channels, or by a server operated by the operator of the retail store to provide connectivity to its store network; or via "the cloud." (In some embodiments, the personalization server 106 may also handle pre-approved applications for issuance of payment accounts, and the mobile device 104 may already be in touch with the personalization server 106 in connection with the customer's pre-approved application. In some embodiments, the customer's name and contact address may be entered into the mobile device 104 or transmitted to the mobile device 104 from another device, which is not shown. The mobile device 104 may transmit the customer's name and contact information to the remote personalization server 106 prior to the commencement of the card personalization operation embodied in subsequent steps illustrated in FIG. 5.) In some embodiments, the customer's name and contact information may be provided by the account issuer.

At 506, the store employee may place the card blank at a suitable position in proximity to the mobile device 104 to enable wireless communication (as per 110 in FIG. 1) between the mobile device and the card blank. In a typical embodiment of the card blank, power for operation of the card blank is contactlessly transmitted from the mobile device 104 to the card blank. In alternative embodiments, the card blank may include and be powered by a battery. The establishment of the data communication path between the card blank and the mobile device 104 is indicated at 508 in FIG. 5.

Since a store employee is handling the mobile device 104 and the card blank, it may be inferred that the store employee is well familiar with how/where the card blank needs to be positioned relative to the mobile device 104. However, for relatively untrained or inexperienced store employees, or for other individuals performing step 506 in other scenarios, the mobile device 104 may provide guidance as to how to perform step 506. For example, the touchscreen on the mobile device 104 may present an animation indicating how and where to place the card blank relative to the mobile device 104. In addition or alternatively, the mobile device may display verbal instructions or output audible instructions, and/or the mobile device may sense/detect the location by its camera(s) or by other means. The payment card personalization app 312 may include an AI (artificial intelligence) module that is responsive to the mobile device's sensing/detection of the card location to tailor instructions to the store employee or other user in view of the current location of the card to instruct the employee/user as to what further movement of the card relative to the mobile device is required for the personalization process to further proceed.

Block 510 follows block 508 in FIG. 5. At block 510, a data communication channel is established between the card blank and the remote personalization server 106 via the mobile device 104. At 512, a mutual authentication procedure may be conducted between the card blank and the remote personalization server 106 as a security measure prior to proceeding with personalization of the card blank. The mutual authentication procedure may include the exchange and/or verification of cryptographic keys or data elements derived therefrom by the personalization server 106 with respect to the card blank, and by the card blank with respect to the personalization server 106.

At 514, data to be written into the card blank to personalize the card blank may be downloaded from the card personalization server 106 to the mobile device 104. The personalization data may include a primary account number (PAN) or a payment token that points to the payment account to be accessed using the payment IC card once it has been personalized. The personalization data may also include the account holder's name, the expiration date for the payment card, a security code, and other data typically written into payment card blanks during personalization.

At 516, the mobile device 104 writes the personalization data into the card blank, which upon personalization becomes a functional payment card ready for use by the individual to which it is being issued. In some embodiments, the card is effectively activated (added to the issuer's record of active payment cards) at the same time that personalization occurs.

In a typical embodiment, the personalization data may be downloaded to the mobile device 104 and/or transmitted to the card blank in an encrypted form.

Shown in phantom is block 518, which may follow personalization of the card blank. At 518, the mobile device 104 may emulate a point of sale device by contactlessly reading the card to confirm that the required personalization data was in fact successfully written into the card.

The store employee may then hand the payment card to the account holder.

In some scenarios, the payment card does not include a magnetic stripe or any of the embossing that visibly indicates the name of the account owner, as well as the account number and other related information. In other words, to the naked eye, the payment card may be identical to all other cards issued under the same issuance procedure, and in some embodiments is not usable with a magnetic stripe reader.

In some embodiments, the mobile device 104 and other devices distributed by the same manufacturer may all be programmed and have suitable reading circuitry such that the mobile devices are enabled to read the account holder's name from the payment card and to display the account holder's name, so that in the event that the account holder later leaves the card behind with a merchant, the account holder can be identified. Other information that may be readable from the card by such mobile devices may include a special code, which the mobile device can display, and which a finder of the card can provide to the issuer after contacting them using the phone number printed on the card. Alternatively, the issuer's phone number can also be readable by the mobile device and displayed to a finder of the card on the mobile device.

In some embodiments, the card blank may include a programmable magnetic stripe (not shown) that is controllable by the IC on the card blank so that the programmable magnetic stripe can store the personalization data or a suitable subset thereof to allow the payment card to be usable after personalization with conventional point of sale magnetic stripe readers.

In other embodiments, in the store environment, a magnetic stripe encoding device may be available to the store employee, and the card blanks may include a conventional (nonprogrammable) magnetic stripe. In some embodiments, the magnetic stripe encoding device may be controllable (via Bluetooth or the like) by the mobile device 104. The store employee may interface the card blank to the magnetic stripe encoding device so that the personalization of the card blank includes writing customary personalization data into the card magnetic stripe by the magnetic stripe encoding device under the control of the mobile device 104.

In some embodiments, the card blank may include one or more programmable display elements (not shown) that are controllable by the IC on the card blank. As a result, after personalization, the display element or elements may display some of the personalization data, such as the account holder's name.

It is likely to be the case that the card blank includes a battery in embodiments in which a programmable magnetic stripe or a display element is included in the card blank.

Another approach to providing a magnetic stripe instant-issuance, personalizable-by-phone payment card will be described in the following discussion.

A magnetic stripe instant-issuance, personalizable-by-phone payment card may be distributed in conjunction and cooperation with a digital wallet contained in the user's mobile device. Digital wallets typically contain device-specific tokens that are linked to an existing physical card. In some circumstances, a card issuer may wish to issue a virtual card to a customer—these may be either prepaid "cards" funded by cash (or top up) at point-of-sale or instant "credit cards" offering a line of credit. However, such "virtual cards" may, in some embodiments, be used only at contactless acceptance points and in-app using digital secure remote payments. Such an issuer may wish to provide a physical card that can be used at legacy acceptance points and online ecommerce environments. These physical cards may be distributed in a retail environment and be personalized by the consumer using their mobile phone rather than being manufactured, personalized for a consumer and delivered by mail. The physical card will contain a token that is linked to the same "virtual card account" that is present in the digital wallet app. From the consumer point of view, he/she will be able to transfer his virtual card into a generic physical card obtained in a retail environment using the wallet app and the phone's near-field communication or "NFC" interface or other mode of phone-to-card communication.

A mobile PIN value set by consumer and used for contactless/digital secure remote payments via their phone may be personalized to the chip in the card for use at Chip & PIN locations where offline PIN is required. The contactless chip in the card would enable low-value contactless transactions. The same PIN value can be used as an online PIN at magnetic stripe locations or where high-value contactless transactions with PIN are supported. Signature would be available as a fall back cardholder verification method (CVM) if the consumer signed the physical card.

The magnetic stripe cannot be personalized by a mobile phone, but is pre-personalized at manufacture to a known magnetic stripe token number. This token number is specific for a particular type of product (credit/prepaid) but is not associated with any issuer so that retail cards may be used by any virtual card issuer. The card may contain physical artwork branding associated with the product type to ensure correct acceptance behavior at payment terminals.

The retail card will need to be activated at point of sale. Activation of the ability for the card to be personalized is performed using a serial number printed and encoded (in a barcode or QR code) on the card and visible through a transparent area of the tamper-evident packaging. It is scanned or keyed using regular point of sale barcode scanners. This is performed at a point-of-sale much like the activation of regular gift/pre-paid cards. This allows card blanks to be put into stores without any particular security concerns as even if a card was stolen from a store it could not be personalized until activated by the retailer. The card is packaged in tamper evident packaging so as to ensure no data is harvested prior to the card being sold/activated. It may be advisable to instruct retailers to activate only cards with their tamper-evident packaging in place.

Once handed to the consumer and activated, with the packaging discarded, the consumer can use his/her mobile device to read the QR code printed on the card which contains the magnetic stripe token number and chip public key used for personalization data encryption, in encrypted form. The QR code is read by "personalize card" feature of the digital wallet app in the mobile device. It would be advisable that this QR code not be visible through the packaging to ensure protection of the card's encrypted chip data. Public key encryption is used to ensure the magnetic stripe token number and chip public key is not available to an unauthorized party and can only be decrypted by the correct card personalization system.

The QR code or barcode or other printed identifier on the card may also be used to identify details of the card to facilitate proper configuration/building of personalization data.

The QR code/barcode/identifier may also be used to automatically find the personalization application, for added convenience for the user.

The public key of the card is not available via the chip's contactless interface. Also, the card programming would ensure that the card would not respond to any commands via the contactless interface except for valid personalization commands. This ensures that cards—prior to delivery to the consumer—cannot be affected by attempts to read data and spoof personalization attempts using the card public key and personalize the card through unopened tamper-evident packaging.

The tamper-evident packaging also contains a magnetic stripe that is encoded or other shielding mechanism to mask the actual magnetic stripe contained on the card. An attempt to use a magnetic stripe reader to read the card magnetic stripe that contains the token number while still in the packaging would be thwarted. This further protects the security of the physical card while inside the tamper-evident packaging.

Data to be personalized to chip, including the chip token number and token payment keys and certificates are created. The personalization data may be encrypted using the public key of the physical card. The encrypted personalization data package is delivered to the consumer's mobile device and when the consumer holds their card near their mobile phone the personalization data is sent using the NFC interface of the phone or via another type of wireless communication between the phone and the card.

On successful personalization, the card magnetic stripe token and chip token are mapped to the funding account PAN. This allows the card to be used at point of sale. Until mapping is completed, any attempted magnetic stripe swipe would result in a declined transaction (as there is no mapping to a funding account PAN). The PAN may be stored in the customer's mobile device in association with the wallet app, and uploaded by the mobile device with the card token to facilitate mapping of the token to the PAN by a remote server.

A CVC2 (i.e., as known in the art, a security code that is normally indented or printed on the back of a card for use in ecommerce transactions) may be generated and can be displayed along with the magnetic stripe token number within the wallet app whenever necessary. An additional security feature is that the complete card token number can be protected by the wallet authentication mechanism ensuring the card is protected for lost/stolen situations.

In order to ease the identification of the physical card with the virtual card, a writable area on the back of the card, below where the signature strip is present, allows the consumer to write, using a pen, a personal description of the virtual account to which this card is linked. For example, the consumer may write "Anybank instant credit". This allows the consumer to more easily identify which card is linked to which account.

While the magnetic stripe token will have a different last 4 digits than the virtual account PAN, nevertheless the chip token number can either have the same token number or a different token number with the same last 4 as the magnetic stripe—to allow transaction reconciliation of "card" transactions by the consumer. The last 4 digits of the magnetic stripe token would be printed on the face of the card, again, to aid consumer recognition and reconciliation of transactions.

In the personalization process described above, the card blank is assumed to be pre-personalized. In an alternative embodiment, however, this may not be the case, and the necessary loading of an application into the card blank may be performed by the mobile device 104, with or without participation by/control from the personalization server 106. To facilitate such "in the field" pre-personalization, the card blank may be programmed ahead of time with a suitable operating system and set of encryption keys.

In the personalization process described above, downloading of the personalization data to the mobile device 104 is assumed to occur immediately before the mobile device 104 writes the personalization data into the card blank. However, this need not necessarily be the case, and in some embodiments, the personalization data may be downloaded to and stored in the mobile device 104 at some point in time prior to the occasion on which the mobile device 104 is operated to write the personalization data into the card blank.

In the scenario as related above in connection with FIG. 5, it was assumed that the card personalization was performed by a store employee using a suitably programmed mobile device 104. However, in other embodiments, the account holder/prospective cardholder may perform the personalization using the account holder's own mobile device. In such an alternative scenario, the account holder may pick up a card blank at a store where a stock of such blanks is maintained. (Or a card blank may be supplied in the same box in which a mobile device is provided for purchase.) The (prospective) account holder may apply for the relevant payment card account product via interaction with a remote server via the account holder's mobile device. Upon acceptance of the account application (which may be instantaneous, or virtually so), the personalization data (and if necessary, prior to that, the card personalization app) may be downloaded to the account holder's mobile device to allow the account holder to use his/her own mobile device to personalize the card blank in a similar manner as described in connection with FIG. 5. It is noted that in some cases, the account holder's mobile device may be furnished to the (prospective) account holder with the card personalization app already loaded in the mobile device.

In some embodiments, the payment IC card may be programmed and loaded with data to perform functions in addition to being presented for point of sale purchase transactions. For example, the IC card may also serve as a customer loyalty account card. In addition or alternatively, the IC card may serve as a customer identification card in dealings with the co-branding/sponsoring entity for the payment account product represented by the payment application of the IC card.

In addition or alternatively, the IC card may provide the same functionality as the card-shaped user authentication token (for accessing back-up data) described in U.S. Pat. No. 9,508,071 (which has a common inventor and a common assignee with the present disclosure).

Still further, and again additionally or alternatively, the IC card may serve one or more other identification and/or data access functions, such as have been generally proposed for IC cards, including serving as a travel document, or as a repository of important personal information, such as medical information.

In other embodiments, in addition to or instead of other features described above, the card may serve as a "something you have" type of user authentication for, e.g., large transactions such as transactions in the hundreds of thousands or millions of dollars, including transactions that require two or more individuals to present their cards for validation for the transaction to be performed.

The payment IC card described herein, and shown in FIG. 2, has been illustrated in an embodiment that is suitable for both contact and contactless point of sale transactions. In other embodiments, however, the payment IC card may be only a contact card, or only a contactless card. In contactless embodiments (including those that are also contact cards), the payment IC card may feature an on/off button (not shown) such that it is usable for contactless interactions (aside from personalization) only when the on/off button is actuated in an "on" condition.

With instant issuance/personalization of payment cards as described herein, the customary delay in getting the card into the user's possession may be eliminated, thereby enhancing convenience for the user, and allowing for more rapid deployment and use of payment cards upon issuance of corresponding payment accounts.

Even an organization that supports and facilitates digitization of payment credentials into mobile devices (such that the mobile devices become payment-enabled) may also find it advantageous to distribute instant-issuance payment IC cards as described in this disclosure. With instant issuance payment IC cards as described herein, the cardholder may enjoy relative convenience in that the physical card may remain in use and in the cardholder's possession for a longer period than a smartphone, given that many individuals "trade up" to a new smartphone every year or two. Other users may find that security concerns make a payment IC card preferable to a payment-enabled mobile device, in that there are relatively few avenues for attack by wrongdoers with respect to a payment IC card.

In the primary scenario discussed with respect to FIG. 5, the personalization was described in the context of a retail store. Another likely venue for card-personalization-via-mobile-device would be a bank branch.

In addition to its above-noted role relative to personalizing the card blank, the mobile device 104 could perform other functions, such as uploading account controls information to the account issuer or payment network operator. Such information could control parameters such as what categories of merchants the payment account (or card) may be used with, what countries the account or card is usable in, transaction amount limit(s), what hours of the day the account/card is usable, etc.

In some scenarios described above, a user may purchase a blank IC payment card in a retail store. It is also contemplated that a user may purchase a blank IC payment card from an unattended vending machine.

In some embodiments, the card blank may be neutral in appearance when first manufactured and sold. The card surface may incorporate electronic ink that is programmed by the card IC during personalization to display suitable branding, including a change or addition of color or colors to the card surface.

Reference has been made above to personalizing a blank IC payment card via a retailer's or user's mobile device. In other scenarios, however, a mobile device not belonging to the retailer or user may be employed to personalize the blank card.

In some embodiments, a payment application may be loaded into the blank card on the same occasion that personalization data is loaded into the blank card.

In some embodiments, the user may select a PIN for the card via the user's mobile device, and the PIN may then be sent to the personalization server as part of the request for personalization data.

In various embodiments, personalization of the card may occur at the time of account issuance, or at a later time.

As used herein and in the appended claims, a "blank" IC payment card is one which has not been personalized with user- and account-specific information. A blank IC payment card may or may not have been pre-personalized by loading with an operating system and/or payment application program and/or marked/printed with branding pertaining to an issuing financial institution, with co-branding, or the like. A blank IC payment card may, but need not, have cryptographic keys stored therein to facilitate pre-personalization of the card.

As used herein and in the appended claims, "proximity" refers to a degree of nearness between two devices that is sufficient to allow NFC communication or like short-range range radio communication between the two devices.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

As used herein, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein, the term "payment card system" or "payment account system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific example embodiments, it should be understood that various changes, substitutions, and alterations apparent to those skilled in the art can be made to the disclosed embodiments without departing from the spirit and scope of the disclosure.

What is claimed is:

1. A method for the instant issuance of payment cards comprising:
    establishing, by a mobile device, a first wireless communication channel between a contactless blank IC (integrated circuit card) payment card and the mobile device that is positioned for wireless communication with the contactless blank IC-payment card;
    establishing, by the mobile device, a second communication channel, via the mobile device, between a remote personalization server computer and the contactless blank IC payment card;
    the establishment of the second communication channel permitting a mutual authentication procedure comprising the contactless blank IC payment card authenticating the remote personalization server computer and the remote personalization server computer authenticating the contactless blank IC payment card as a security measure; and
    transmitting, by the mobile device, electrical operating power from the mobile device to the contactless blank IC payment card while receiving, and then writing payment card personalization data onto the contactless blank IC payment card thus activating the contactless IC payment card, the payment card personalization data having been downloaded from the remote personalization server computer to the contactless blank IC payment card via the second communication channel in response to a successful mutual authentication procedure.

2. The method of claim 1, wherein the payment card personalization data is received via a data communication channel over both the second communication channel and the first communication channel.

3. The method of claim 1, further comprising, prior to the receiving and storing step:
    the mobile device transmitting a user's name to the remote personalization server computer.

4. The method of claim 3, wherein said payment card personalization data downloaded from the remote personalization server computer to the contactless blank IC payment card includes said user's name that was transmitted to the remote personalization server computer from the mobile device.

5. The method of claim 3, further comprising, prior to the receiving and storing step:

the mobile device transmitting user contact information to the remote personalization server computer.

6. The method of claim 1, wherein the contactless blank IC payment card is also configured as a contact IC card.

7. The method of claim 1, wherein the contactless blank IC payment card has a payment application program stored therein prior to said establishing steps.

8. The method of claim 1, wherein the establishing steps and the receiving and storing step are performed at a retail store.

* * * * *